UNITED STATES PATENT OFFICE.

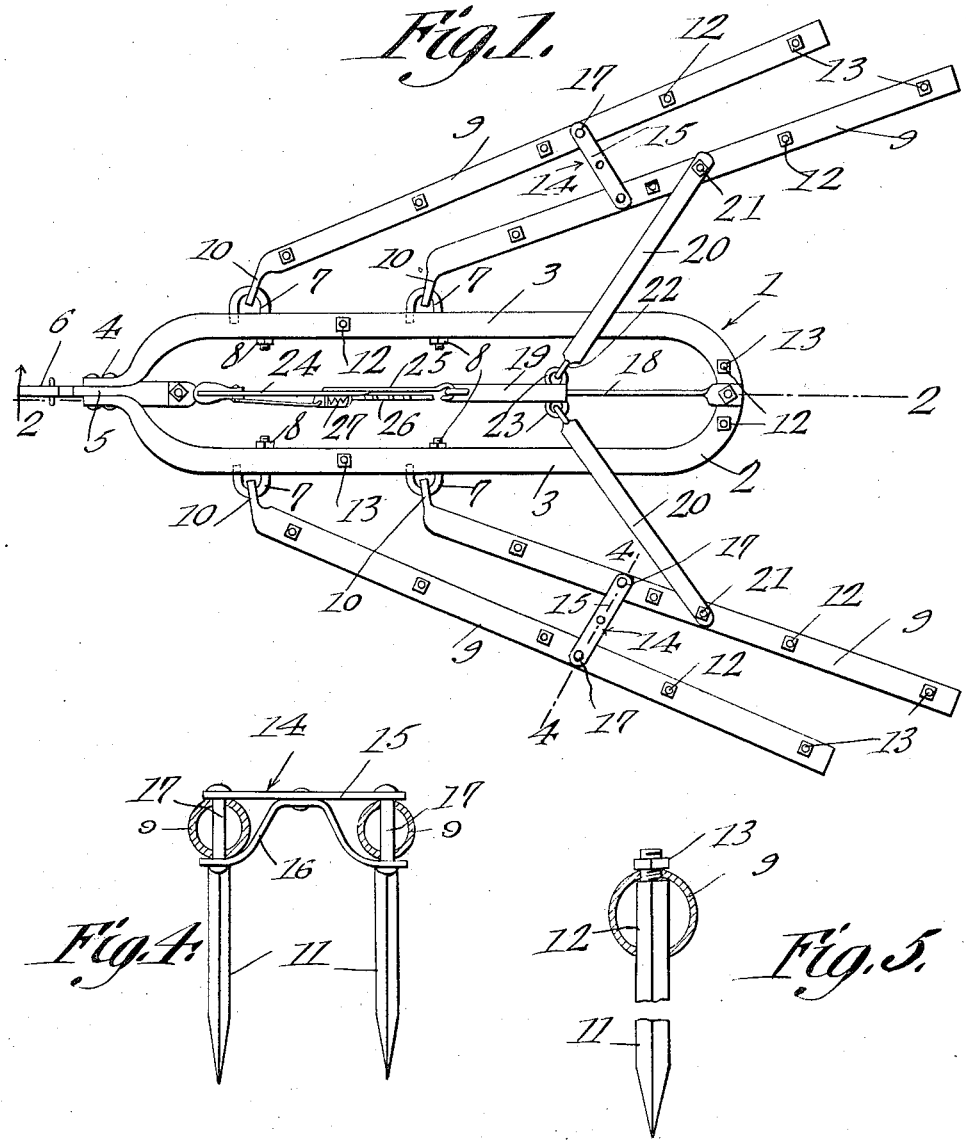

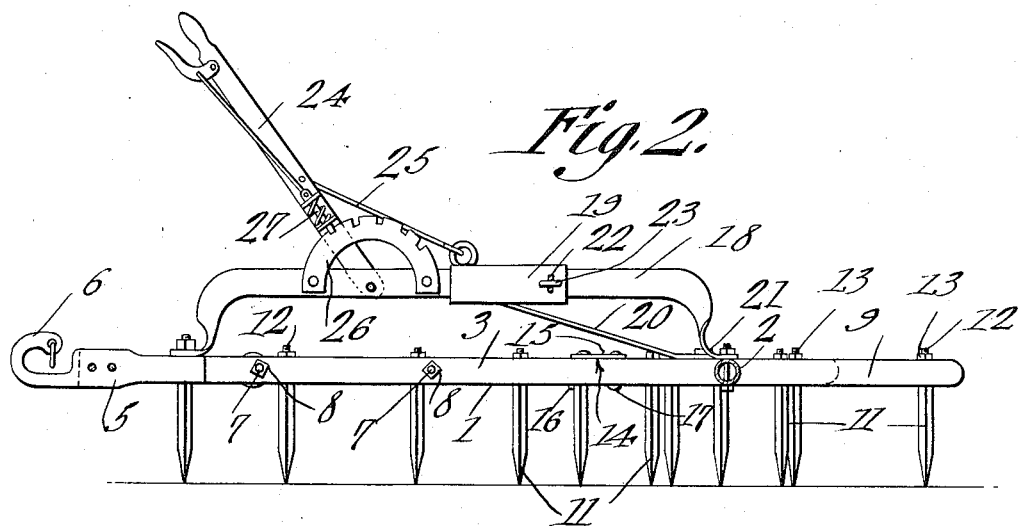
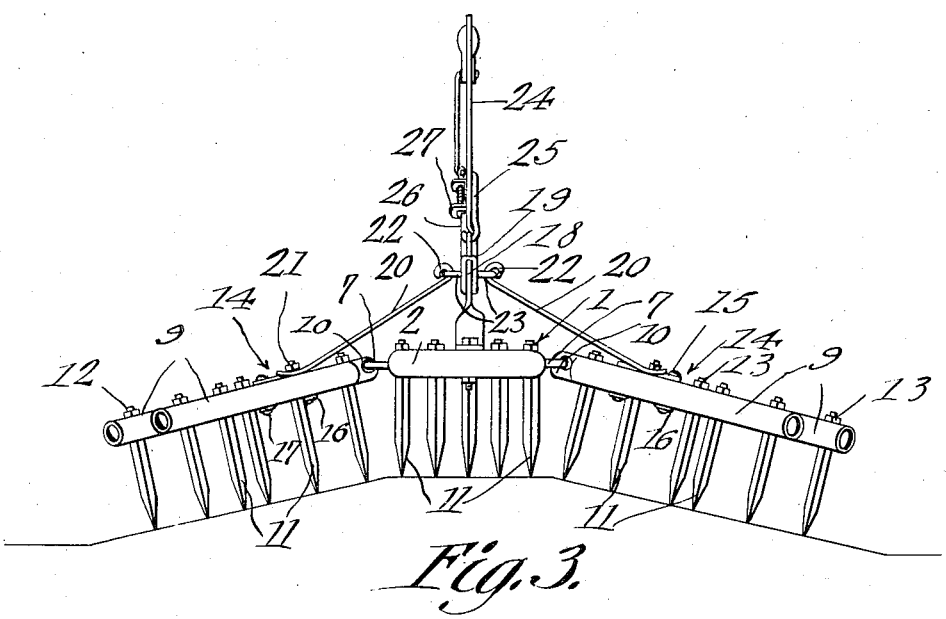

EDGAR PIERCE CANNEDY, OF CLOVIS, NEW MEXICO.

HARROW.

1,153,027.  Specification of Letters Patent.  Patented Sept. 7, 1915.

Application filed March 25, 1915. Serial No. 16,935.

*To all whom it may concern:*

Be it known that I, EDGAR P. CANNEDY, a citizen of the United States, residing at Clovis, in the county of Curry and State of New Mexico, have invented a new and useful Harrow, of which the following is a specification.

The present invention appertains to harrows, and aims to provide a novel and improved harrow adapted particularly for harrowing listed ground, although the device may be employed with success and propriety for level ground.

This invention contemplates the provision of a harrow of unique construction, whereby it may be drawn over a ridge or within a furrow, and will be adapted to harrow the bottom and sides of a furrow, or the top and sides of a ridge, the device being adjustable to accommodate various furrows and ridges in an efficient manner.

It is also within the scope of the invention to provide an earth tilling implement of the nature indicated, which will be comparatively simple and inexpensive in construction, and convenient, serviceable, efficient and thoroughly practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawings, wherein:—

Figure 1 is a plan view of the improved harrow. Fig. 2 is a longitudinal section thereof, taken on the line 2—2 of Fig. 1. Fig. 3 is a rear view of the harrow. Fig. 4 is an enlarged sectional view on the line 4—4 of Fig. 1. Fig. 5 is an enlarged fragmental view, illustrating one of the harrow teeth attached to its beam.

In carrying out the invention, there is provided a central longitudinal frame 1 formed from a pipe or similar element 2, which is doubled to provide the elongated open frame 1 having rounded ends. The ends of the pipe 2 are disposed at the forward end of the frame 1 and are offset toward each other, as at 4, and have riveted or otherwise secured therebetween, a draft member 5 whose forward end is formed into a hook 6 for hitching the draft animals to the harrow. The frame 1 constructed as described and illustrated, is substantial and convenient for the intended purposes.

Carried by the side bars 3 of the frame 1 is a pair of opposite or right and left hand wings. To this end, two pairs of hooks 7 are disposed at the opposite sides of the frame 1, and have their shanks engaged through the respective side bars 3 of the frame and provided with nuts 8 threaded thereon and bearing against the inner sides of the bars, the bills or tips of the hooks 7 being engaged into the bars 3 to hold the bends of the hooks in place. Each wing embodies a pair of tubular beams 9, the beams at the opposite sides diverging rearwardly, and the beams having their forward ends formed into eyes 10 engaged to the bends of the hooks 7, so that the beams may swing vertically and to and from the longitudinal median line of the frame 1.

Each of the beams 9 is provided with a series of harrow teeth 11 engaged through the bottom of the beams and having the upper shanks 12 engaged upwardly through the top of the beam, and provided with nuts 13 threaded thereon and bearing against the top of the beam to clamp the teeth firmly in place. The side bars 3 and rear end of the frame 1 are also provided with harrow teeth 11, whereby the teeth of the frame 1 may harrow the bottom of a furrow, or the top of a ridge, while the teeth of the wings or beams 9 serve to harrow the sides of the furrow or ridge.

The beams 9 of each pair are connected intermediate their ends, by a link 14, whereby the beams of each pair will swing in unison. The link 14 embodies an upper bar or section 15 bearing upon the beams 9, and a lower bar or section 16 bearing against the bottoms of the beams 9 and having its intermediate portion offset upwardly and riveted or otherwise secured to the intermediate portion of the bar or section 15. Pivot rivets 17 are engaged through the ends of the bars 15 and 16 and the beams 9, whereby the link 14 may swing relative to the beams when the beams are swung inwardly and outwardly.

An arched longitudinal guide bar 18 is disposed above the frame 1, and has its rear end secured upon the rear end of the frame 1, and its forward end secured upon the rear end of the draft member 5, and a slide 19 is slidably mounted upon the upper straight portion of the guide bar 18 to move longitudinally. Links 20 operatively connect the slide 19 and the opposite beams or wings, the remote or outer ends of the links 20 being pivotally connected to the intermediate portions of the rear beams 9, by means of pivot bolts 21, and the inner or adjacent ends of the links 20 having eyes 22 loosely engaging eyes 23 provided upon the sides of the slide 19. The links 20, when the slide 19 is held stationary, prevent the beams 9 swinging inwardly and outwardly, or backwardly and forwardly, but permit or enable the beams to swing upwardly and downwardly.

The adjusting or actuating device for the slide 19 embodies a hand lever 24 fulcrumed to the guide bar 18 in advance of the slide 19, and a link 25 connecting the hand lever 24 and the top of the slide 19, the hand lever 24 projecting upwardly from the guide bar. A notched or toothed segment 26 is terminally secured to the guide bar 18 around the fulcrum of the lever 24, and a manually controlled spring pressed pawl 27 is carried by the lever 24 for engaging the segment 26 to hold the hand lever at any position to which it is swung, and to thereby hold the slide 19 at its set position.

In use, when the harrow is drawn over the soil, through the medium of the draft member 5, the beams 9 will trail from the sides of the central frame 1. By swinging the hand lever 24, the slide 19 may be moved along the guide bar 18, to swing the beams 9 toward or away from the rear end of the frame 1 to either increase or decrease the extent of the harrowing action. Thus, when the slide 19 is moved rearwardly, the links 20 which diverge rearwardly from the slide 19, will move toward an alining or straight line position, so that the outer ends of the links 20 will be moved away from the frame 1, to thereby move the beams 9 outwardly or forwardly. This will result in the spreading of the beams to increase the extent of the harrowing operation. When the slide 19 is moved forwardly, it will draw the beams 9 rearwardly and inwardly to decrease the path of operation. In this manner, by adjusting the hand lever 24, the harrow may be adjusted to accommodate various widths of furrows and ridges, it being noted that the wings or beams at the opposite sides of the frame may swing upwardly and downwardly under any adjustment to ride upon the sides of a furrow or ridge.

When the harrow is operated over a ridge, the harrow teeth of the frame 1 will agitate or pulverize the soil at the top of the ridge, while the teeth of the beams will pulverize the soil at the sides of the ridge, and when the harrow is employed in a furrow, the teeth of the frame will harrow the bottom of the furrow while the teeth of the beams will work the sides of the furrow.

Having thus described the invention, what is claimed as new is:

A harrow comprising a central longitudinal frame embodying a doubled member having its ends disposed forwardly, a draft member secured between the ends of the frame member, rearwardly diverging beams connected loosely to the sides of the frame, a guide bar terminally secured to the said draft member and rear end of the frame, an adjustable slide mounted upon the guide bar, and links connecting the said slide and beams.

In testimony that I claim the foregoing as my own, I have hereto affixed my signature in the presence of two witnesses.

EDGAR PIERCE CANNEDY.

Witnesses:
  E. H. HIGH,
  A. F. BRIAN.